(12) United States Patent
Hakozaki

(10) Patent No.: US 6,707,604 B2
(45) Date of Patent: Mar. 16, 2004

(54) CONFOCAL MICROSCOPE SYSTEM AND CONTROLLER THEREOF

(75) Inventor: Hiroyuki Hakozaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/114,932

(22) Filed: Apr. 4, 2002

(65) Prior Publication Data

US 2002/0171926 A1 Nov. 21, 2002

(30) Foreign Application Priority Data

Apr. 5, 2001 (JP) ........................... 2001-106798

(51) Int. Cl.[7] .............................. G02B 21/00

(52) U.S. Cl. .................. 359/368; 359/363; 359/385

(58) Field of Search .................... 359/385, 363, 359/368

(56) References Cited

U.S. PATENT DOCUMENTS

| 5,432,865 A | * | 7/1995 | Kasdan et al. ............ 382/128 |
| 5,621,532 A | * | 4/1997 | Ooki et al. ................ 356/444 |
| 5,932,871 A | * | 8/1999 | Nakagawa et al. ...... 250/201.3 |
| 6,130,967 A | * | 10/2000 | Lee et al. .................. 382/302 |
| 6,341,035 B1 | * | 1/2002 | Miura et al. .............. 359/363 |

* cited by examiner

*Primary Examiner*—Thong Nguyen
*Assistant Examiner*—Arnel C. Lavarias
(74) *Attorney, Agent, or Firm*—Miles & Stockbridge, P.C.

(57) ABSTRACT

A controller of a confocal microscope is provided with an image capturing function and a temporary storing function. On the other hand, the host computer is provided with an image display, image recording, and other processing functions. Further, the controller and the host computer are connected to each other with an asynchronous communication interface. With such a system configuration, it is possible to maintain high independence of the controller and the host computer. Accordingly, even in the course of the image capture by the controller, other processings can be smoothly executed on the host computer side.

4 Claims, 4 Drawing Sheets

CONFOCAL MICROSCOPE SYSTEM AND CONTROLLER THEREOF

The disclosure of the following priority application is herein incorporated by reference: Japanese Patent Application No. 2001-106798 filed Apr. 5, 2001.

BACKGROUND OF THE INVENTION

1. Field of the Invention

The present invention relates to a confocal microscope system which comprises a confocal microscope, a controller, and a host computer.

2. Related Background Art

A first prior art will be described.

FIG. 3 is a view for showing a system configuration according to the prior art.

Referring to FIG. 3, a confocal microscope system 50 is substantially comprised of a confocal microscope 11, a controller 51, and a host computer 61.

Inside this controller 51, there is provided a scan control board 52. This scan control board 52 outputs a scan signal to the confocal microscope 11. The confocal microscope 11 moves an observation point on a sample for scanning in accordance with this scan signal so that image signals are successively generated. Note that in the present specification, the "board" is not limited to a single printed circuit board, but is used to include a device, a unit, and other means.

On the other hand, from the scan control board 52, a sync. signal (a horizontal sync. signal, a vertical sync. signal, or a pixel clock) is outputted in synchronism with the scan signal.

In addition, an image capture board 63 is mounted on a PCI (peripheral component interconnect) bus 62 inside the host computer 61.

This image capture board 63 receives an image signal from the confocal microscope 11, and a sync. signal from the scan control board 52.

The image capture board 63 A/D converts the image signal in synchronism with this sync. signal to generate image data. The image capture board 63 successively transfers the generated image data to a memory 65 in the host computer 61 through the PCI bus 62.

A CPU 64 inside the host computer 61 conducts image processing or image analysis for the image data in the memory 65.

The CPU 64 also transfers the image data to a recording apparatus 67 through the PCI bus 62, and thereafter, stores the image data in a file.

Further, the CPU 64 transfers this image data or a result of the image analysis to a video board (not shown) through the PCI bus 62, and displays the image data or the result of the image analysis on a monitor 66.

In addition, the CPU 64 conducts such processings as image processing, image analysis, image display, and image comparison, for the image file inside the recording apparatus 67, simultaneously with an operation for fetching an image from the confocal microscope 11.

A second prior art will be described below.

FIG. 4 is a view for showing the system configuration according to another prior art.

Referring to FIG. 4, a confocal microscope system 70 is substantially comprised of the confocal microscope 11, a controller 71, and a host computer 91. A scan control board 73 and an image capture board 74 are mounted on a bus 72 of this controller 71.

This scan control board 73 outputs a scan signal to the confocal microscope 11. The confocal microscope 11 moves an observation point on the sample for scanning in accordance with the scan signal so that image signals are successively generated. This image signal is given to the image capture board 74. On the other hand, the scan control board 72 gives a sync. signal to the image capture board 74.

The image capture board 74 A/D converts the image signal in synchronism with this sync. signal to generate image data. The image capture board 74 successively transfers the generated image data to a memory 76 in the controller 71 through the bus 72. A CPU 75 inside the controller 71 conducts image processing or image analysis for the image data in the memory 76.

The CPU 75 also transfers this image data to a recording apparatus 80 through the bus 72 and a bus controller 79, and thereafter, stores the image data in a file.

Further, the CPU 75 transfers this image data or a result of the image analysis to a video board 77 through the bus 72, and displays the image data or the result of the image analysis on a monitor 78.

In addition, the CPU 75 conducts such processings as image processing, image analysis, image display, and image comparison, for the image file in the recording apparatus 80, simultaneously with an operation for fetching an image from the confocal microscope 11.

Such various operations of the CPU 75 as described above are controlled from the host computer 91 side through an interface 81, a monitor 92 for GUI (graphical user interface) operation and an input device 93.

Note that, in the confocal microscope device 11 described above, in order to reduce the scanning time, image signals may sometimes be sampled during both the going and returning courses in the main scanning direction. In such a case, a processing for reversing the right and left direction of the returning course is required separately in the step of image capture or image processing.

Also, in the confocal microscope 11 described above, a sample may be scanned by using a plurality of detection light beams at the same time. In such a case, it is required to conduct image capture for each of the detection light beams. Observations in such case include a fluorescent observation for detecting fluorescent lights having a plurality of wavelengths by adding a plurality of fluorescent reagents to a sample.

Incidentally, in the confocal microscope, continuous phototaking of a sample is also conducted. In this case, the conventional image capture board conducts a capture processing of an image signal substantially on real time, and transfers a large amount of generated image data to a memory through a bus. Under these circumstances, the bus is occupied with the large amount of image data. In addition, the CPU suffers complicated control for the image capture processing. On the other hand, the user may sometimes give an instruction to conduct image processing or image display in the course of the capture processing of an image. In this case, the CPU tries to conduct the image processing simultaneously with the image capture. This state allows the image capture to be synchronous with the image processing.

An operation of the CPU is conspicuously disturbed by such occupation of the bus or complication of the CPU. As a result, there arise troubles such that image processing, image analysis, image display, image storage, or the like, for the image data which is temporarily stored in the memory is conspicuously delayed.

Also, when the bus use can not be adjusted on the CPU side and on the image capture board side, a load of the bus becomes excessive instantaneously, so that another trouble such as a failure in image capture (missing of image frame(s)) is also possible.

These troubles arise more conspicuously when, for example, sampling in the returning course and scanning with a plurality of light beams are conducted at the same time or one after another so that the number of image signals to be captured by the image capture board becomes larger.

Hitherto, in order to solve such problems, it is required to use a high-speed CPU or a special and high-performance image capture board. For this reason, the degree of freedom of the system configuration is inevitably low, so that the system configuration can not cover the wide computer environment (including the kind of the computer, a board to be used, and an OS) demanded by users.

SUMMARY OF THE INVENTION

The present invention has its first object to provide a confocal microscope system which is capable of smoothly executing operations such as an image processing operation without using a high-speed CPU or a special and high-performance image capture board even in the course of an image capture.

In order to achieve the above first object, according to the present invention, there is provided a confocal microscope system comprising:
 a) a confocal microscope;
 b) a controller having:
    an image capture unit for generating image data on the basis of an image signal of an image acquired by said confocal microscope;
    a temporary storage unit for temporarily storing said image data generated by said image capture unit; and
    an asynchronous transmission unit for asynchronously transmitting said image data which is temporarily stored in said temporary storage unit; and
 c) a host computer having:
    an asynchronous reception unit for asynchronously fetching said image data which is stored in said temporary storage unit; and
    an image processing unit for processing said image data fetched by said asynchronous reception unit.

A second object of the present invention is to provide a controller which is suitable for controlling a confocal microscope to generate image data of a sample, and to transmit the image data of the sample to the host computer.

In order to achieve the second object, according to the present invention, there is provided a controller for controlling a confocal microscope to generate image data of a sample, and to transmit said image data of said sample to a host computer, comprising:
 a scan control unit for controlling said confocal microscope to move an observation point of said confocal microscope to scan said sample;
 an image capture unit for fetching an image signal of said light reception unit in synchronism with a scan and move signal from said scan control unit so as to generate said image data of said sample based on a relation between said fetched image signal and said observation point;
 a temporary storage unit for temporarily storing said image data which is generated by said image capture unit; and
 an asynchronous transmission unit for transmitting said image data temporarily stored in said temporary storage unit in response to an asynchronous transfer request from said host computer.

Still another object, an embodiment, and various advantages of the present invention will be described in a more detailed manner with reference to drawings.

DESCRIPTION OF THE PREFERRED EMBODIMENTS

An embodiment of the present invention will be described below with reference to the drawings.

Figure 1:
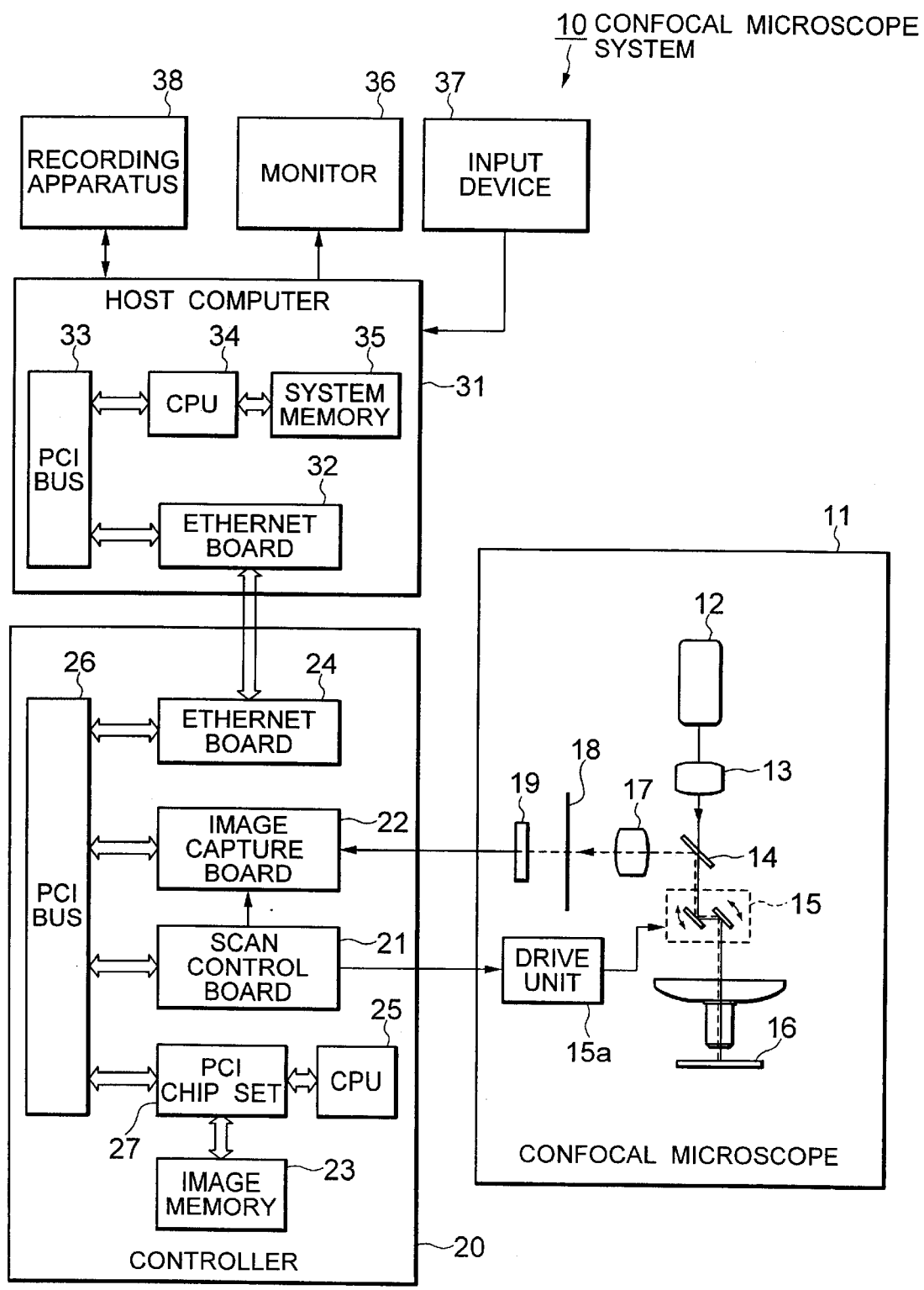
FIG. 1 is a view for showing the configuration of a confocal microscope system 10.

FIG. 1 is a view for showing the configuration of a confocal microscope system 10.

This confocal microscope system 10 is substantially composed of a confocal microscope 11, a controller 20 and a host computer 31. The configurations of these members will be described below in turn.

First, the configuration of the confocal microscope 11 will be described.

The confocal microscope 11 of the present embodiment comprises:
 (1) a light source 12 for illumination;
 (2) an illumination optical system 13 for irradiating a sample 16 with a light beam from the light source 12;
 (3) a beam splitter 14 for splitting a reflected light beam from the sample 16 from an illumination optical path, and an observation optical system 17 for collecting the light beam split by the beam splitter 14;
 (4) a pin hole 18 disposed at an optically conjugate position with an observation point on the sample 16, through the observation optical system 17;
 (5) a drive unit comprising a scan unit 15 composed of (a plurality of) movable mirrors and a drive unit 15a for driving the scan unit 15 to move the observation point; and
 (6) a light receiving unit 19 for receiving a light beam passed through the pin hole 18 to convert this light beam into an image signal.

Next, the configuration of the controller 20 will be described.

The controller 20 of the present embodiment comprises:
 (1) a scan control unit comprising a scan control board 21 for controlling the drive unit 15a to move the observation point to scan the sample 16;
 (2) an image capture unit comprising an image capture board 22 for fetching an image signal from the light receiving unit 19 in synchronism with a scan and move signal from the scan control board 21 so as to generate image data of the sample 16 on the basis of a relation between the fetched image signal and the observation point;

(3) a temporary storage unit comprising an image memory 23 capable of storing image data for several frames;

(4) an asynchronous transmission unit preferably comprising an Ethernet (registered trade mark) board 24 of 100 base T for transmitting image data in the image memory 23 in response to an asynchronous transfer request from the host computer 31;

(5) a CPU 25 for system control; and (6) a PCI bus 26 with the Ethernet board 24, etc., mounted thereon and a PCI chip set 27 for effecting bus control of the PCI bus 26.

Next, the configuration of the host computer 31 will be described.

The host computer 31 of the present embodiment comprises:

(1) an asynchronous reception unit preferably comprising an Ethernet board 32 for transmitting an asynchronous transfer request to the controller 20 and for fetching the image data temporarily stored in the image memory 23 asynchronously;

(2) a PCI bus 33 with the Ethernet board 32, or the like, mounted thereon, a CPU 34 for processing image data, and a system memory 35;

(3) a monitor 36 for displaying image data and a console display, and an input device 37; and (4) a recording apparatus 38 of image data and a control program.

Note that the CPU 34, the system memory 35, the monitor 36, the input device 37, and the recording apparatus 38 constitute an image processing unit.

Next, an operation of the system will be described.

Figure 2:
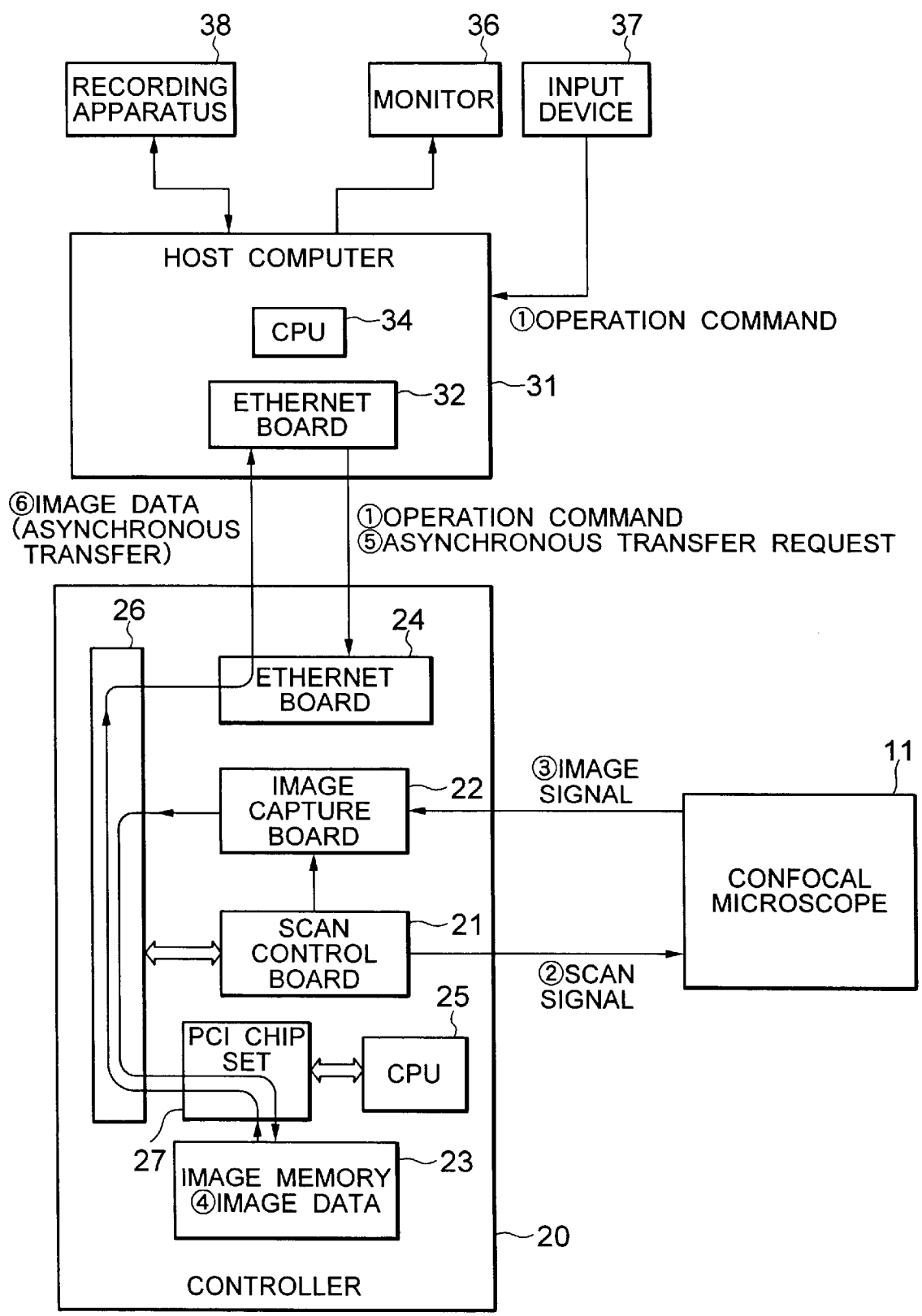
FIG. 2 is a view for explaining a system operation of the confocal microscope system 10.
Figure 3:
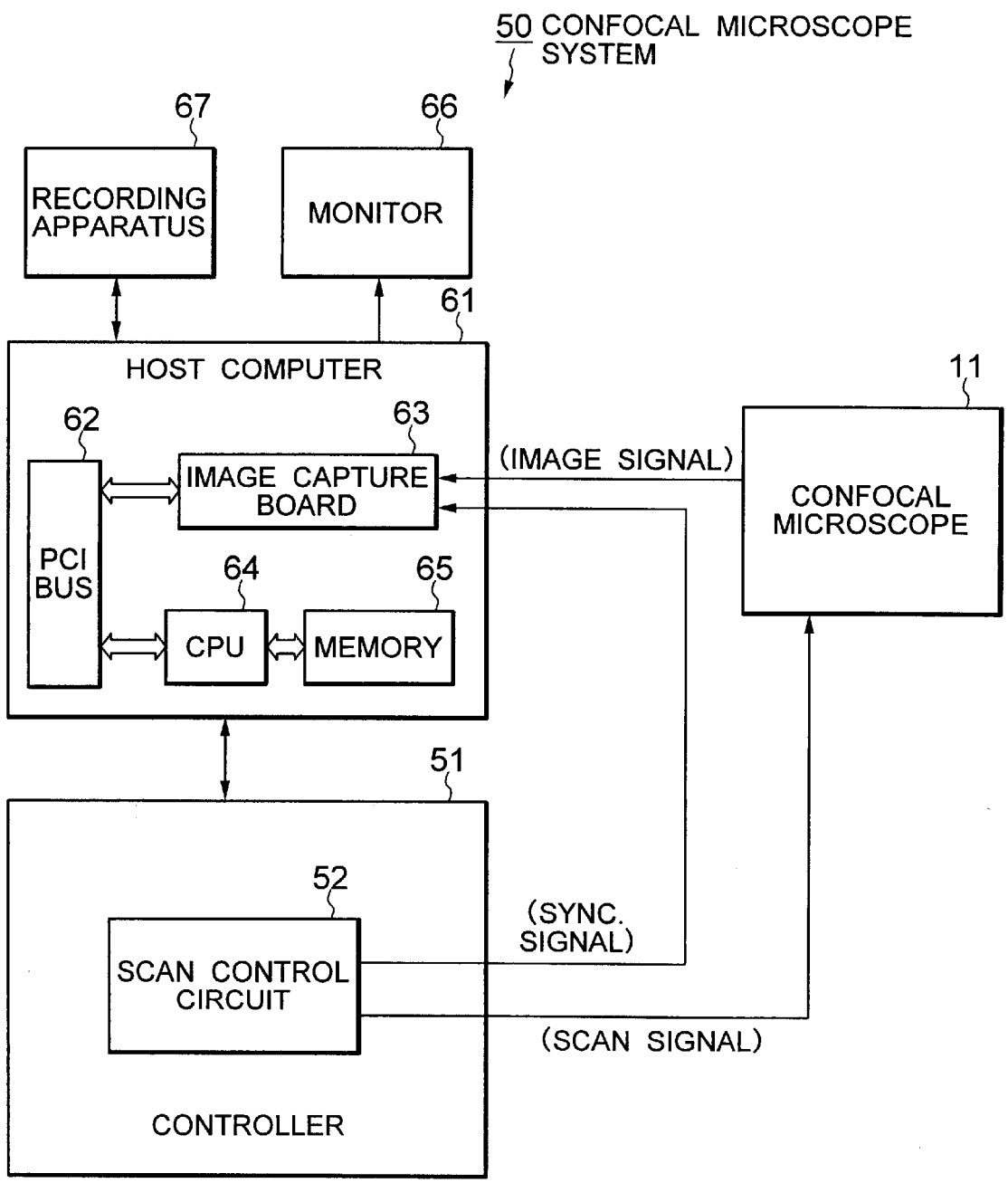
FIG. 3 is a view for illustrating the first prior art.
Figure 4:
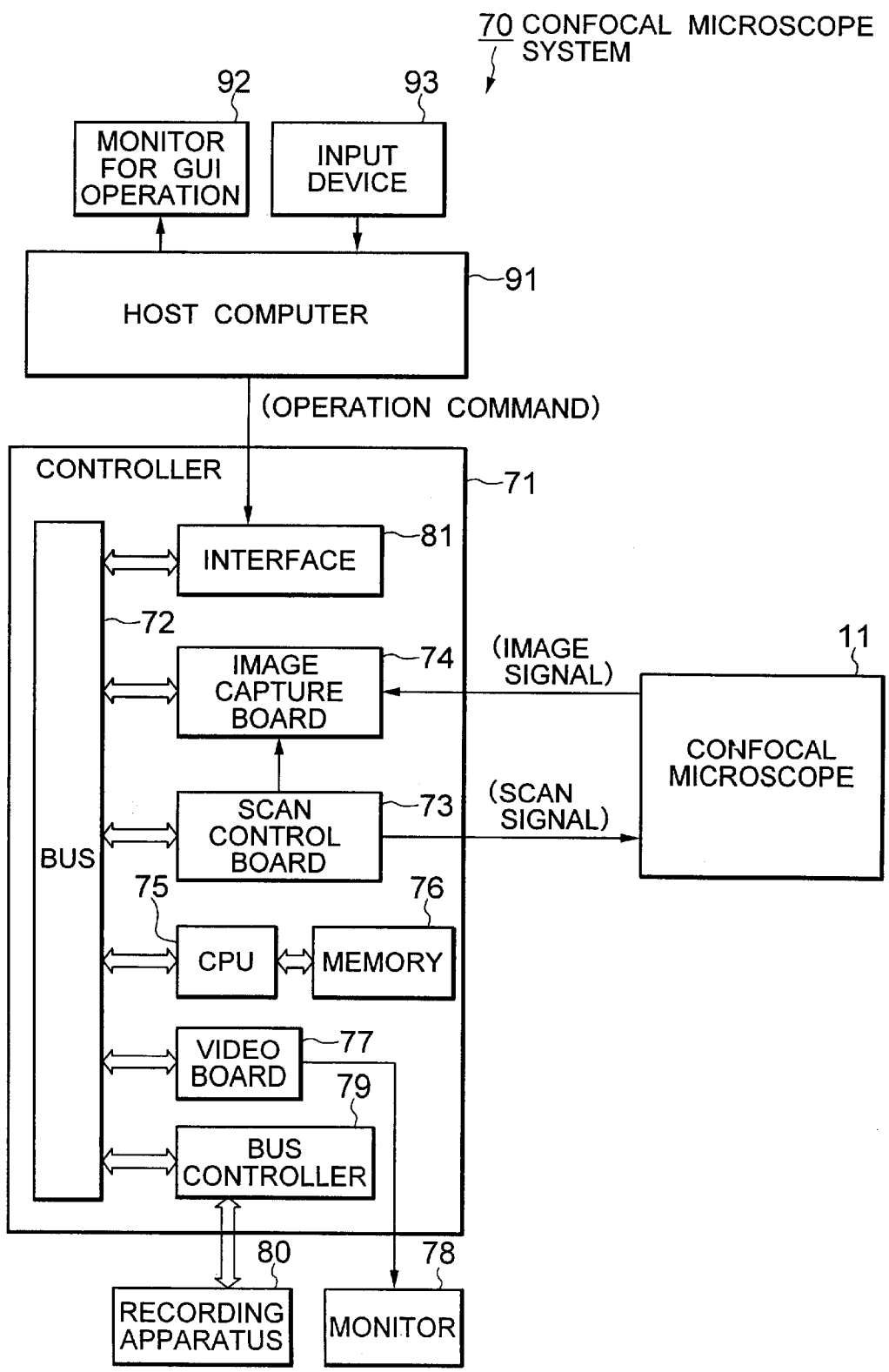
FIG. 4 is a view for illustrating the second prior art.

FIG. 2 is a view for explaining an operation of the confocal microscope system according to the present embodiment.

An operation of the entire system will be described below with reference to FIG. 1 and FIG. 2.

First, a control program in the recording apparatus 38 is executed on the side of the host computer 31. As a result, the CPU 34 displays a console display on the monitor 36 to standby for a user operation.

In this state, the user operates the input device 37, while watching the console display, to input an operation command. This operation command is transmitted to the controller 20 through the Ethernet boards 32 and 24. The CPU 25 inside the controller 20 sends this operation command to the scan control board 21.

The scan control board 21 outputs a scan signal to the confocal microscope 11 in accordance with this operation command.

On the confocal microscope 11 side, the drive unit 15a drives the scan unit 15 in accordance with this scan signal to move an observation point on the sample 16 for scanning. Upon such scanning movement of the observation point, an analog image signal is outputted from the light receiving unit 19.

The image capture board 22 inside the controller 20 converts this analog image signal into a digital one in compliance with the pixel clock of the scan control board 21, so that pixels are arrayed in accordance with a horizontal sync. signal and a vertical sync. signal. Consequently, the image data is successively generated (image captured) on real time in a buffer of the capture board 22.

The image capture board 22 conducts DMA (direction memory access) transfer of the captured image data to the image memory 23 through the PCI bus 26 and the PCI chip set 27. The image memory 23 temporarily stores the image data successively transferred thereto.

In such a state, the CPU 34 on the host computer 31 side executes the control program and issues an asynchronous transfer request so as to transfer the image stored in the image memory 23 to the host computer side. This asynchronous transfer request is transmitted to the controller 20 through the Ethernet boards 32 and 24. The CPU 25 inside the controller 20 waits for an idle time of the PCI bus 26 in compliance with this asynchronous transfer request. As described so far, the asynchronous transfer in the present invention indicates a transfer of an image which is stored in the image memory 23 during the idle time of the PCI bus to the host computer side in order to execute an image processing on the host computer 31 side.

During the operation for the image capture, the PCI bus 26 is preferentially used to transfer the captured image data. Accordingly, a returning time period of a scan signal or a waiting time for accumulation of an internal buffer of the image capture board 22 is turned to be an idle time of the PCI bus 26. Such an idle time for conducting the asynchronous transfer includes, in addition to an idle time of the PCI bus 26 as described above, a time in which the image capture board has not yet acquired an image signal. In such an idle time, the asynchronous transfer may be executed.

The CPU 25 asynchronously transfers the image data which is accumulated in the image memory 23 to the host computer 31 through the PCI bus 26 and the Ethernet board 24, by utilizing such idle time of the PCI bus 26.

During the time period from the start of observation of a sample to the completion thereof, the image capture is continuously executed. However, there exists a slight time span in which no signal is present in the PCI bus, as described above. As a result, according to the present invention, it is possible to execute an image processing in a slight time span in which no signal is present in the PCI bus under observation, so that the image processing can be executed even during the capture of an image of a sample under observation.

The CPU 34 on the host computer 31 side receives from time to time the image data which is asynchronously transferred through the Ethernet board 32 upon execution of the control program. The CPU 34 executes other processings such as to display this image data on the monitor 36 or to record the same in the recording apparatus 38.

Note that the CPU 34 also executes image processing, image analysis, image display or image recording with respect to the image data, for example, in the recording apparatus 38, by utilizing a standby time for the asynchronous transfer.

With a series of the operations described above, the basic system operation of the confocal microscope system 10 is completed.

As described above, in the present embodiment, the controller 20 and the host computer 31 are connected to each other asynchronously through the Ethernet boards 24 and 32. Accordingly, the hardwares of the both boards are highly independent from each other so that an operation on the host computer 31 side is not slowed by any means even if an operation on the controller 20 side is occupied with the image capture.

As a result, even when the operations for the image capture such as the "round trip sampling" and the "detection with a plurality of light beams" become more complicated, the operation of the host computer 31 is not slowed by any means.

Also, according to the present invention, it is possible to entirely leave the operations such as image display or image recording to the host computer 31, so that the controller 20 does not take part in the operations such as the image display or image recording. Also, an image transfer to the host computer 31 may be also executed asynchronously. Thus, it is rendered possible to execute the operation for the image capture most preferentially. As a result, there arises little possibility of missing image frames(s) in the image capture.

Further, on the side of the host computer 31, the processings such as image display or image recording and a GUI operation using the console display are concentrated. Accordingly, the user can conduct an operation centering on the host computer 31, so that a system environment with improved operability can be configured.

On the other hand, when image data is required on the host computer 31 side, an image transfer is requested to the controller 20. In this case, the controller 20 can transfer the image data asynchronously. For this reason, the controller 20 gives priority to the operation for the image capture, so that it can transfer the image data by utilizing the idle time of the image capture. Accordingly, the image capturing operation on the controller 20 side is not hindered by the transfer of the image to the host computer 31, whereby a trouble such as missing image frame(s) is hardly brought about.

Further, on the host computer 31 side, the hardware resources are not occupied during the standby time for the asynchronous transfer of an image. Consequently, a processing of another image, and the like, can be executed without hindrance.

With these effects, in the present embodiment, the performance required for the host computer 31 is lower than that of the prior art. Also, even for asynchronous communication, an asynchronous interface for general purposes which has a line speed substantially enough for image transfer can be used. Accordingly, it becomes possible to almost freely select devices for the host computer 31 and the asynchronous communication out of the existing products, whereby it becomes easier to configure the confocal microscope system in compliance with the computer environment desired by the users.

Note that, in the embodiment described above, the asynchronous transfer of image data is realized by using the Ethernet boards 32 and 24. However, the present invention is not limited to this. In general, it suffices if the communication interface has a transmission speed suitable for transferring image data and can realize the asynchronous transfer. As such a communication interface, giga-bit Ethernet of 1000 base T or the like, IEEE1394, USB2, Bluetooth, etc., may be employed.

Also, in the embodiment described above, image data is transferred by using the PCI bus inside the controller 20. However, the present invention is not limited to this. In general, it suffices if the bus has a transmission speed suitable for transferring image data. As such a bus, VME bus, or the like, may be employed.

In addition, in the embodiment described above, a standby time is generated for the asynchronous transfer of an image. Then, it is preferable that the asynchronous reception unit on the host computer 31 side estimates the time at which the image data is required so as to send an image transfer request to the controller side prior to the estimated time. For instance, the time at which an image can be transferred is estimated in accordance with a speed for acquiring the image and a timer unit is provided inside the CPU 31, so that the image transfer can be conducted from the image memory on the controller 20 side periodically in compliance with the timer.

Note that an execution related to a control program or a recording medium thereof is not limited to the foregoing embodiment. For instance, it is possible to deliver a control program through a communication line so as to record the control program on a system memory or on a hard disc of a computer on the addressed station. With such delivery of the program, the delivering station of the control program can produce the control program or a recording medium thereof at a site of the addressed station. Further, the delivering station can make public that the control program can be delivered through the communication line, or can render a brokerage service to provide the information on a site at which the control program is stored.

The system of the present invention provides the controller with the image capturing function and the temporary storing function and, on the other hand, makes the host computer side share the processing functions of image display, image recording, and the like. Further, the controller and the host computer are connected to each other in such a manner that the image data can be asynchronously transferred. As a result, the hardwares of both units can be maintained highly independent from each other.

Accordingly, if the controller is occupied with the image capturing operation, the hardware resources on the host computer side are not occupied. As a result, even during the image capture, the host computer can execute the image processings, except the image capture, smoothly without receiving a little influence. Thus, any trouble on the computer side, such as an operation of the computer being conspicuously delayed due to the image capture, hardly occurs. It suffices for the host computer related to the present invention if it has the specifications substantially enough to allow its own image processing software to operate.

In addition, according to the prior art, in order to control the microscope or to acquire an image, it is required to install such hardware as a scanner control board or an image capture board in the host computer. In order to control such hardware from software, it is required to prepare a driver which depends on an operating system (OS).

However, according to the present invention, there arises no such problem.

Also, according to the prior art, it is not possible to smoothly execute an image processing in the course of the image capture unless a CPU capable of high speed processing with an operational frequency of about, for instance, 1.5 GHz is employed. However, with the configuration of the present invention, it is possible to smoothly execute an image processing in the course of the image capture even with a CPU which has about two thirds operational frequency (for instance, about 1 GHz) as much as a conventional high-speed CPU.

What is claimed is:

1. A confocal microscope system comprising:

a) a confocal microscope having:
   an observation optical system for collecting light from a sample:
     a drive unit for causing a scanning movement of the observation optical system to scan the sample;
     a light receiving unit for receiving light from the observation optical system and converting the light into an image signal;
 b) a controller having:
   an image capture unit for generating image data based on the image signal from the light receiving unit of said confocal microscope;
   a temporary storage unit for temporarily storing said image data generated by said image capture unit;

an asynchronous transmission unit for asynchronously transmitting said image data which is temporarily stored in said temporary storage unit;

a first CPU for controlling the asynchronous transmission unit;

a control unit for issuing a scan signal to said drive unit in said confocal microscope to control the scanning movement and a control signal for the image capture unit; and a bus used in common for image data transmission from the image capture unit and the temporary storage unit;

c) a host computer having:

an asynchronous reception unit for asynchronously fetching said image data which is stored in said temporary storage unit;

a second CPU which issues an asynchronous transfer request to said asynchronous transmission unit in said controller; and an image processing unit for processing said image data fetched by said asynchronous reception unit; and wherein d) said image processing unit in said host computer issues the asynchronous transfer request to said controller so that the image data stored in said temporary storage unit may be transferred from said temporary storage unit to said asynchronous transmission unit; and e) said first CPU in said controller, in accordance with said transfer request from said host computer, so controls said asynchronous transmission unit to transmit the image data in said temporary storage unit to said asynchronous reception unit in said host computer through said bus during idle time thereof, which is a returning time period of the scan signal from an end of one scanning movement to a start of a next scanning movement, or a standby time for accumulation of a buffer in said image capture unit.

2. A confocal microscope system comprising:

a) a confocal microscope having:

an observation optical system for collecting light from a sample;

a drive unit for causing a scanning movement of the observation optical system to scan the sample;

a light receiving unit for receiving light from the observation optical system and converting the light into an image signal;

b) a controller having:

an image capture unit for generating image data based on the image signal from the light receiving unit of said confocal microscope;

a temporary storage unit for temporarily storing said image data generated by said image capture unit;

an asynchronous transmission unit for asynchronously transmitting said image data which is temporarily stored in said temporary storage unit;

a control unit for controlling the asynchronous transmission unit, the image capture unit and the drive unit, the control unit issuing a scan signal to control the scanning movement; and a bus used in common for image data transmission from the image capture unit and the temporary storage unit;

c) a host computer having:

an asynchronous reception unit for asynchronously fetching said image data which is stored in said temporary storage unit;

a CPU which issues an asynchronous transfer request to said asynchronous transmission unit in said controller; and an image processing unit for processing said image data fetched by said asynchronous reception unit; and wherein d) said image processing unit in said host computer issues the asynchronous transfer request to said controller so that the image data stored in said temporary storage unit may be transferred from said temporary storage unit to said asynchronous transmission unit; and e) said controller, in accordance with said transfer request from said host computer, so controls said asynchronous transmission unit to transmit the image data in said temporary storage unit to said asynchronous reception unit in said host computer through said bus during idle time thereof, which is a returning time period of a scan signal from an end of a scanning movement to a start of a next scanning movement, or is a standby time for accumulation of a buffer in said image capture unit.

3. A confocal microscope system according to claim 1, wherein said idle time is a time when no image data is present in said bus.

4. A confocal microscope system according to claim 2, wherein said idle time is a time when no image data is present in said bus.

* * * * *